United States Patent [19]
Schmanski

[11] Patent Number: 4,715,743
[45] Date of Patent: Dec. 29, 1987

[54] MOBILITY GUIDE TILE FOR VISUALLY HANDICAPPED

[76] Inventor: Donald W. Schmanski, 400 W. King St., Carson City, Nev. 89701

[21] Appl. No.: 873,954

[22] Filed: Jun. 13, 1986

[51] Int. Cl.[4] .......................... E01F 9/00; E01C 5/20; E01C 5/22; G09B 21/00

[52] U.S. Cl. .......................................... 404/9; 404/15; 404/39; 404/42; 428/167; 428/172; 428/328; 434/112; 52/177; 52/181; 116/63 R; 116/205; 116/DIG. 17

[58] Field of Search ...................... 404/9, 6, 12, 15, 42, 404/35, 36, 39; 434/113, 112; 428/167, 172, 328; 116/DIG. 17, 63 R, 205; 52/177, 179, 181

[56] References Cited

U.S. PATENT DOCUMENTS

| | | | |
|---|---|---|---|
| 112,168 | 2/1871 | Neefus | 52/181 |
| 348,782 | 9/1886 | Sawyer | 52/177 |
| 691,434 | 1/1902 | Barnett | 52/177 |
| 873,420 | 12/1907 | Farmer | 52/181 |
| 875,440 | 12/1907 | Lamson | 52/181 |
| 2,018,260 | 10/1935 | Henderson | 404/15 |
| 2,421,171 | 5/1947 | Trautvetter et al. | 52/181 X |
| 2,574,090 | 11/1951 | Dotsen | 404/15 |
| 4,080,087 | 3/1978 | Phillips | 404/9 X |
| 4,288,487 | 9/1981 | Eigenmann | 404/9 X |
| 4,490,069 | 12/1984 | Cushman et al. | 404/15 |
| 4,620,816 | 11/1986 | Kupfer | 404/9 X |

*Primary Examiner*—Stephen J. Novosad
*Assistant Examiner*—John F. Letchford
*Attorney, Agent, or Firm*—Thorpe, North & Western

[57] ABSTRACT

A tile for positioning on walkways, crosswalks and other areas of pedestrian traffic for providing direction and warning to visually handicapped persons. The tile comprises a flat plate having a chamfered edge and including raised bumps coupled to a top surface of the plate and projecting upward therefrom to a maximum height of less than 8 millimeters. A flowable adhesive used at the chamfered edge provides for a tapered seal around the tile or for formation of an expansion joint between two contiguous tiles. The bumps are configured as truncated structure having a larger base and tapered to a top surface which bears the foot traffic. A bottom surface of the tile includes a uniform adhesive layer which enables attachment of the tile to a street surface. A system of tiles for assisting visually handicapped persons across the street is also disclosed and includes a combination of dot and bar tiles oriented to give direction to the pedestrian. An accompanying guide strip is attached at the street surface adjacent the dot and bar tiles and detected with the swing of a cane to lead along the preferred pedestrian course.

21 Claims, 8 Drawing Figures

MOBILITY GUIDE TILE FOR VISUALLY HANDICAPPED

BACKGROUND OF THE INVENTION

1. Field of Invention

This invention relates to modular tactile surfaces which are applied to roads, walkways and other areas of pedestrian traffic for providing guidance to persons who are visually handicapped. More specifically, the present invention relates to flexible tiles having circular and elongated tactile projections which alert the blind to hazardous conditions or provide travel directions.

2. Prior Art

Pedestrian delineation devices generally rely on visual recognition. For example, U.S. Pat No. 1,647,861 discloses a type of metallic button having a raised surface which provides guidance to pedestrians crossing a street. In most cases, these raised devices have been for the purpose of replacing painted crosswalk markings which tend to wear off. See, for example, U.S. Pat No. 1,698,594.

It is apparent that typical pedestrian delineation devices which depend on observation are unlikely to be useful to the visually handicapped person. It is estimated that 11,500,000 visually-impaired persons having impaired mobility exist within the United States. 500,000 of these individuals are legally blind. Some adaptations of pedestrian guidance devices have been oriented toward meeting the needs of such visually handicapped pedestrians. For example, U.S. Pat No. 4,080,087 describes a railess walkway which utilizes footplates which are fastened to the ground. These plates include humps which provide tactile guidance and orientation to the blind pedestrian. These footplates are designed to have a step region which enables the blind person to correctly position his foot on the footplate. Once in position, this footplate gives guidance as to the proper direction for movement. The footplate may further include a hump disposed within the step region to provide further information such as identification of hazards, obstacles, change in level or the like. Operation of this footplate depends upon proper orientation of the foot of the blind individual in the step region.

The narrow applications of the tile of the '087 patent fail to provide solutions to a major problem which has developed with the federal requirement for curb cuts and blended corners at crosswalks and curbs. The federal standard now requires that certain curbs include a curb cut which enables wheelchair pedestrians easy passage. Although only 645,000 physically handicapped persons fall within this need, this requirement has become a hazard for eleven and a half million visually impaired persons.

Such curb cut construction has resulted in at least seven (7) major problem areas. For example, curb cuts provide little tactile reference to indicate where the sidewalk ends and the street begins. A blind person may take one or more steps into the street without even being aware of the impending danger. More often than not, curb cuts are made an an angle to the street and tend to cause the blind individual confusion as to which direction he should take to cross to a safe corner. Similarly, curb cuts are typically not made within the crosswalk stripes themselves. Usually, they bisect the corner of the curb in order to facilitate directional travel across either of two intersecting streets. Unfortunately, the blind cannot see this diagonal path and may thereby be lead into the open intersection.

Blended corners, or corners in which the street is gradually tapered upward to meet the level of the curb, present an even more serious hazard. Blind individuals have no way of gaining an orientation as to the direction of pedestrian traffic to cross a street. Similarly, loading platforms at rapid transit or public transportation sites leave little guidance for visually handicapped persons as to safe waiting locations or directions of travel.

Recognizing the possible risk of curb cuts to the blind population, the federal government required the use of brush strokes and flanking borders of grooved lines at curb cut location. It has now been found that such actions have provided no useful function of guidance to the visually handicapped. Brush strokes are not detectable through footwear and grooved lines fail to give the warning and guidance that are needed.

Some development of more generic tiles for visually handicapped persons has occurred in Japan. Specific tiles having either raised dots or bars have been utilized to alert blind persons of special conditions. These tiles are 300 milimeters square and have a symmetrical array of either (i) round, truncated, hemispherical bumps or dots approximately 5 milimeters in height and 23 milimeters wide at the base and 11.5 milimeters at the top thereof or (ii) elongated bumps or bars. The latter bar tile includes four (4) elongated bumps disposed in parallel relationship across the surface of the tile. The length of these bars is approximately 285 milimeters and the width is approximately 34 milimeters at the base. These bars likewise taper to a top flat surface having a width of 22 milimeters. The bars and bumps are detected by use of the blind person's cue or cane. The nature of bump (circular or elongated) gives the blind person an instruction or appropriate direction. Although this design provides limited safety required for normal applications, some improvements are needed.

For example, the use of such tiles adhered to a sidewalk or road surface, fails to provide an optimum level of tactile sensitivity. An abrupt edge or tile corner can also pose a hazard to visually handicapped persons who have difficulty distinguishing sharp edges and changes in elevation. Such a corner may cause any pedestrian to stumble or trip and severely injure themselves.

Despite the variety of tactile devices which have been developed for assisting the visually handicapped, difficulty in developing an acceptable tile has continued. The problem creating this difficulty may be generally characterized at opposing sides of an apparent paradox for tile design. For example, a primary design guideline is to create a contoured surface which can be detected through the sole of the foot or with a cane to provide warning or directional information for the blind person. The ability to define specific tactile features which permit uniform recognition through the sole of a shoe has remained an unsolved problem. At the opposite side of the paradox is the need to maintain a low profile on any raised tile structure so that the physically handicapped and other pedestrians are not confronted with obstacles which may trip or otherwise cause injury to the pedestrians. In short, the design paradox for tactile plates or tiles for assisting visually handicapped is to create a contoured surface high enough to be detectable yet low enough not to create problems for both the physically handicapped and the unimpaired pedestrian.

OBJECTS AND SUMMARY OF THE INVENTION

It is an object of the present invention to provide a tactile plate which can be applied to a sidewalk or street surface which provides the required low profile for safety while at the same time giving sufficient height or other means for conveying tactile information through the shoe sole to the blind or physically handicapped person.

It is a further object of this invention to provide a tactile plate fabricated of synthetic rubber or other soft material and including a non-elastic, dense inner core positioned within raised structure of the plate to enhance the tactile sensitivity to an individual standing thereon.

It is further an object of this invention to provide a uniform tactile plate which provides standardized information regarding pedestrian conditions, direction of movement or hazards which may be quickly recognized and understood.

It is a still further object of this invention to provide a tactile plate having a sealed periphery or intermediate expansion joints to avoid raised edges which become obstacles to all pedestrians.

It is a further object of this invention to provide a tactile plate which provides notice of hazardous conditions to a blind individual.

Yet another object of this invention is to provide tactile plates and method for orienting such plates to provide assistance to handicapped persons through a crossCwalk or along other specific pedestrian traffic areas which are unusually fraught with danger.

A further object of this invention is to provide a guidestrip which is adapted for use with the end of the cane to improve guidance and safety in crossing streets and other hazardous pedestrian areas.

These and other objects are realized in a tile for positioning on walkways and other areas of pedestrian traffic which provides both directional and locational information to a visually handicapped person. The tile includes a flat plate comprised of a flexible, polymer composition which has a top and bottom surface. The edge of the plate is chamfered to a thickness of less than 2 milimeters at its extreme edge for improving adherence of the plate to a street surface. An array of raised bumps or bars are formed at the top surface of the plate and project upward to a maximum height above the surface of less than 8 milimeters. These bumps are configured as truncated structure having a larger base and tapering to a narrower top, which includes a substantially flat surface adapted to withstand repeated contact with footwear. The shortest width measurement across the base of the bump is within the range of 20 milimeters to 50 milimeters. A uniform, flowable adhesive layer is applied at the bottom surface of the tile to provide means for attachment of the tile at the street surface with a sealed periphery or expansion joint around the edge of the tile. This adhesive has a force to compression of 50 to 200 pounds to enable a secure bond between the tile and the road surface.

The tile may include a rigid core or plate enclosed within the bump to increase tactile sensitivity and give the sensation of greater height than that actually existing in the tile. For example, a dot tile may have a spherical or tetrahedral shape, while a bar tile has a rod as the embedded element. The element is positioned near the bottom surface of the tile at the walkway surface to enhance tactile detection. The dot and bar tile configurations are combined as part of a system for providing guidance to visually handicapped persons for crossing a street or intersection. A guide strip may also be used as part of the system for providing direction to visually handicapped persons as they cross the street surface. This guide strip includes a track which is adapted for contact with the cane of the handicapped individual to assist in maintaining proper direction of movement.

Other objects and features of the present invention will be apparent to those skilled in the art from the following detailed description, taken in combination with the accompanying drawings.

DETAILED DESCRIPTION OF THE INVENTION

Figure 1:
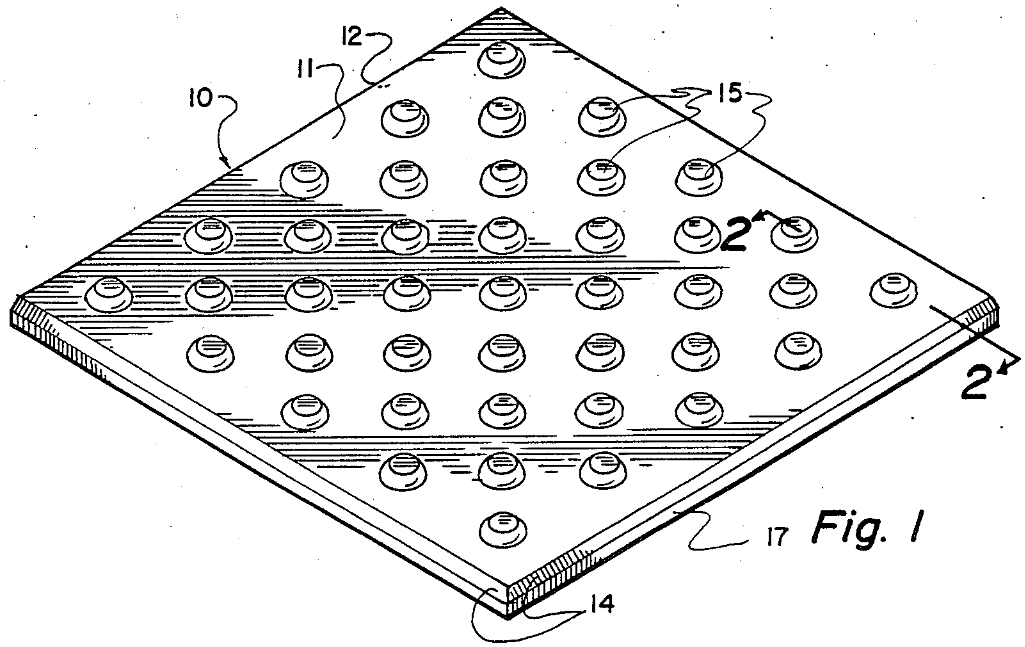
FIG. 1 shows a perspective view of a dot tile formed in accordance with the present invention.

FIG. 1 illustrates one embodiment of the subject invention wherein the tactile surface comprises an array of dots or non-elongated bumps. Specifically, the tile (also referred to as a dot tile) comprises a flat plate made of flexible, polymer composition such as synthetic rubber or other polymers which are adapted for use in the outdoor environment. The importance of utilizing a flexible polymer arises in part because of ease of application, but also because of studies which show that sound and resilient cues are more detectable than materials which rely only on textural cues. Accordingly, if the same array of dots are impressed in concrete or other materials forming the walkway the visually handicapped individual would not detect the difference in sound or resiliency as would be experienced when moving from a pavement surface to a rubber or polymer surface.

The flat plate 10 includes a top surface 11 and a bottom surface 12 which define a plate thickness 13 of less than 2 milimeters. The preferred thickness is considered to be approximately 1.8 milimeters to provide an appropriate balance between flexibility, minimal thickness for safety and appropriate sound and textural response.

Figure 8:
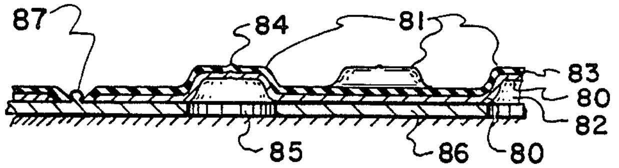
FIG. 8 depicts a section similar to that shown in FIG. 2, wherein the bumps are formed on a metal support plate.

The peripheral edge 14 of the plate is chamfered from 1.8 milimeters down to approximately 1 milimeter in thickness. Although the chamfered edge contributes to safety by reducing the height of the plate wall and thereby reducing risk of tripping or stumbling of the handicapped individual upon unexpectedly encountering this wall, the main purpose is for proper adhesion of the plate to the walkway. Specifically, the inventor has discovered that prior use of flexible tiles resulted in loss of adhesion and resultant lifting and curling of plate edges. For example, the Japanese tile has the adhesive at the periphery removed to prevent the adhesive material from bleeding around the edge of the tile and defacing the appearance of the tile surface. The present invention maintains the flowable adhesive to the very edge of the tapered tile periphery. By tapering the peripheral edge of the plate, the attaching flowable adhesive is better able to maintain adhesive contact between the tile edge and the walkway surface. As the tile and adhesive are pressed to the walkway surface, the flowable adhesive is forced out from under the tile and forms a tapered seal 24 around the tile periphery. This same flow forms a waterproof, dustproof expansion joint 87 between the tapered edge of adjacent tiles such as shown in FIG. 8. Accordingly, the chamfered edge will typically be less than 1.5 milimeters in thickness at its extreme periphery to maintain these desired properties of adhesive contact and tapered seal or protective expension joint.

The primary function of the plate 10 is to provide a convenient method for positioning an array of bumps 15 at a location and height appropriate for providing notice to the visually handicapped of a hazardous condition or a proper direction for movement. The raised bumps 15 are coupled to the top surface 11 of the plate and project upward therefrom to a maximum height above the top surface of less than 6 milimeters. It has been determined that optimum balance of safety and sound/textural sensitivity is realized when the array of bumps have a height less than 6 milimeters and are appropriately spaced as described hereafter. As will be noted from the figures, these bumps are formed as part of the plate structure by compression molding, injection molding or other fabrication techniques well known to those skilled in the art.

Figure 2:
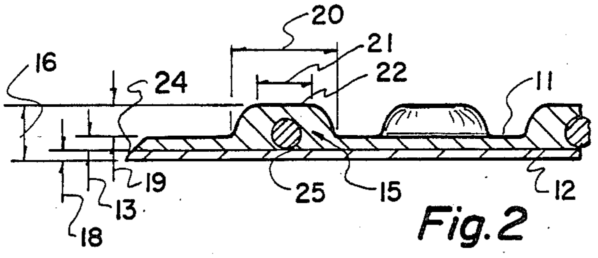
FIG. 2 a cross-section taken along the lines 2—2 of FIG. 1.
Figure 5:
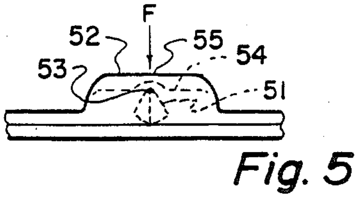
FIG. 5 an additional embodiment for the insert within the raised bump of the subject tile.
Figure 3:
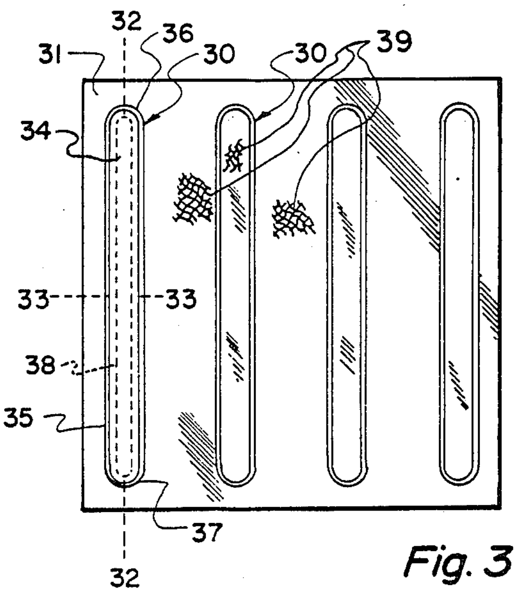
FIG. 3 is a graphic portrayal of an additional embodiment of the subject tile, utilizing elongated or bar structure as opposed to the circular or dot configuration of FIG. 1.

Although the configuration of the bumps may vary, certain height limitations exist in order to maintain the desired balance between safety, textural sensitivity and uniformity. For example, the total height 16 of the plate and bump above the roadway surface is preferably 7.77 milimeters, allowing one milimeter of thickness for the adhesive 17. The properties of the adhesive thickness 18 will be discussed hereafter. The preferred height of the bump 15 above the top surface 11 is 5 milimeters, with the plate thickness 13 being 1.77 milimeters. The bumps have a minimum width measurement 20 within the range of 20 milimeters to 50 milimeters. The preferred minimum width of the dot bump is 23 milimeters and the bar bump is 34 milimeters at its base. It should be noted that longer dimensions exist where the bumps are elongated as shown in FIG. 3. No minimum or maximum lengths are provided with respect to the elongated distance because the individual stepping on such a bump need only sense the thickness along one direction to identify the raised structure as part of a tactile surface. In each case, however, the bumps are configured as truncated structure having a larger base attached at the top surface 11 of the plate and tapering to a narrower top 21 which includes a substantially flat surface 22. This structure may be spherical in configuration as shown in FIG. 2, or it may be conical as illustrated in FIG. 5. Other truncated, tapering structures will be envisioned by those skilled in the art.

The arrangement of bumps shown in FIG. 1 is referred to herein as a dot tile because the bumps are non-elongated in any particular direction. Although the dot tile of FIG. 1 shows circular bumps, a square bump would likewise be feasible in a dot tile configuration. FIG. 3, however, illustrates the use of elongated bumps 30 or bars which are positioned on a plate 31 similar in construction and design to the plate 10 of FIG. 1. Whereas the dot tile of FIG. 1 includes 41 separate bumps, the elongated bar tile of FIG. 3 includes only 4 bumps. The utility of a different configuration for the bar tile bump 30 arises from the directional information which can be given from the elongated structure. Further explanation of this feature is given hereafter. When viewed along its longitudinal axis 32, the cross-section of the elongated bump 30 has an appearance substantially the same as the cross-section of the dot shown in detail at the left side of FIG. 2. A view along the shorter axis 33 would have a comparable appearance, except that the bump would be elongated with flat surface 22 (FIG. 2) being extended the full length of a flat surface 34 configured at the top of the elongated bump 30. Accordingly, the elongated bump has a configuration similar to a half-section bar cut approximately along the longitudinal axis 32 through the diameter of the bar to form the larger base 35 of the bump. The top of the bar 30 is truncated to form the narrower top section 34 as a flat surface substantially parallel with the plate. Each opposing end 36 and 37 of the bar is rounded to resemble a quarter sphere, similar to that shown in FIG. 2 for the bump in cross-section. Because of the increased surface area of the bump of a bar tile, a rough texture 39 is impressed in the top surface 34 to prevent slipping when the bar tile is wet. It has been found that the particular configuration of bar tiles as disclosed herein have a preferred texture wherein grooves, channels or ridges are formed to a depth or height of approximately 0.25 milimeters at the surface. This same textured surface 39 should be placed between bar bumps to avoid slipping of the end of a cane.

With respect to the bar tile shown in FIG. 3, the total dimension of the plate 31 is 300 milimeters square. The 4 bars of the tile extend to lengths of approximately 285 milimeters at the base. Each of the bars are displaced approximately 75 milimeters on center from adjacent bars.

As has been previously mentioned, synthetic rubber compositions are ideal material for the subject tiles. Such compositions include the resilience and high coefficient of friction which enhances the textural, sound and other physical properties required for a tactile surface for the blind. In addition, the material should possess resistence to wear, weather, ozone, ultraviolet and temperature variations to ensure long life and durability. It has been found that the following approximate mechanical properties are preferred.

| | |
|---|---|
| SPECIFIC GRAVITY | 0.97–0.99 |
| TENSILE STRENGTH (ASTM D412) | 1100 PSI |
| ULTIMATE ELONGATION | 300–550% |
| HARDNESS (SHORE A) | 70–75 |

The surface finish should be a minimum of 60 RMS to enhance the co-efficient of friction in wet and dry conditions. Typically, the color of the composition will be yellow and will conform to Federal Color No. 33538 of standard 595A. This particular yellow color is close to that final color detectable by visually handicapped persons prior to going totally blind.

To enhance the sensitivity for tactile detection at the foot of the handicapped pedestrian, a dense core element 25 may be inserted within the bump 15 or 30. It has been discovered that the use of a rigid, non-compressible core insert having a diameter of less than approximately 6 mm provides a remarkable increase in sensitivity to the handicapped person through tactile detection. This increased sensitivity arises because of a sensation of greater height to the tile than actually exists. Accordingly, a reduced bump height can be utilized by fully enclosing such a rigid core 25 within the bump. The core 25 should extend to the base of the adhesive to provide contact and support from the walkway surface.

Figure 4:
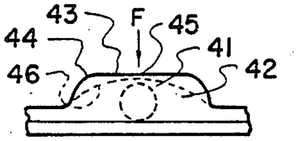
FIG. 4 illustrates an embedded element within the raised dot structure of FIG. 1 or bar structure of FIG. 3.

This core may be configured in the shape of a sphere 41 as shown in FIG. 4. Here the core 41 is embedded within a bump 42, slightly below the top surface 43 of the bump and extending near the base adhesive. As force F is applied at the top of the bump, the edges 44 of the bump deform downward. The center 45 of the bump, however, encounters the sphere 41 supported by the rigid walkway and resists compression and deflection. This results in formation of a pointed contour 46 which gives greater sensitivity through the sole of a shoe and thereby enables easier detection of the bump on a walking surface.

Similarly, a tetrahedral shape 51 (FIG. 5) can be inserted within a bump 52 wherein a pointed end 53 is oriented upward toward the intended contacting footwear. Force F applied by the foot of the handicapped individual deflects or deforms the bump downward 54 resulting in a pointed central part 55 which increases sensitivity of the bump through a thick soled shoe. Other shapes will be apparent to those skilled in the art. A suitable insert for the spherical shape comprises a ball bearing constructed of steel or other dense or rigid material.

Similarly, a rigid insert 38 may be imbedded in the bar bump of the tile shown in FIG. 3. When viewed in cross-section along the longitudinal axis 32, the inserted rod would have a circular cross-section as shown for element 25 in FIG. 2. This rod would extend nearly the full length of the bar as shown in FIG. 3.

Adherence of the tile to a walkway surface is a critical aspect of the present invention. Prior efforts to retain the tile in an attached position have been frustrated by separation of the peripheral edge of the tile from the pavement Whereas prior tiles have been squared at the edge, the present tile incorporates a chamfered edge which has been discovered to solve the difficulty of adhesive contact between the tile and the pavement. This is accomplished by use of adhesives which are flowable and which fall within the limitations as set forth hereafter. Specifically, a uniform adhesive layer 17 is applied at the bottom surface 12 to a thickness of at least 0.5 milimeters. The adhesive should have a force to compression of 50–200 pounds. Furthermore, any type of fabric reinforcement should not be applied because it tends to inhibit flowability of the adhesive and thereby prevent proper attachment of the tile against the pavement and formation of a retainer gasket 87 around the periphery of the chamfered edge of the tile (FIG. 8). The use of filler material that would inhibit flowability of the adhesive as the tile is compacted should also be avoided for this same reason. The adhesive must be able to retain its tack and adhesive qualities from minus 50 degrees F. to plus 140 degrees F. and should preferably have elongation of approximately 450 percent at 77 degrees F. The preferred Force to compression (ASTM–C972) is 80–165 pounds. Flowability as per ASTM–C639 (190 degrees F.) is approximately 0.020 inches (2 hours). Yield strength at 77 degrees F. (ASTM–C908) is approximately 5 PSI. Release paper is applied at the exposed surface of the adhesive prior to attachment at the pavement surface.

Figure 6:
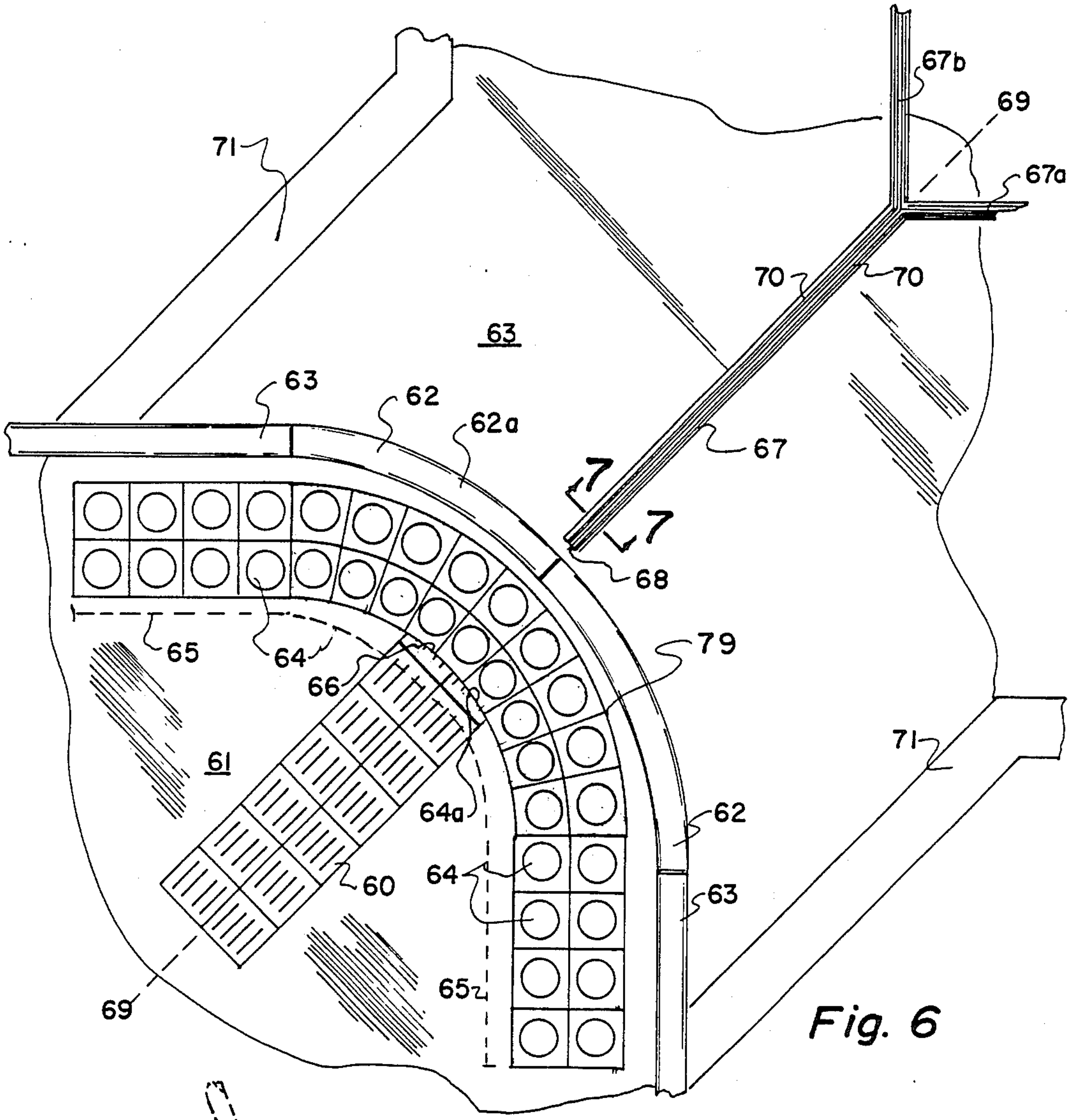
FIG. 6 discloses in graphic form a system of tiles for use at a corner of an intersection with a right hand turn lane.

The combination of dot FIG. 1 and bar FIG. 3 tiles can be utilized as part of a system for guiding a visually handicapped person across a street or intersection. In particular, it is useful as part of a system for guiding an individual through a lowered curbing, as occurs in curb cut or blended corners. FIG. 6 graphically illustrates the combination of tiles which comprise such a guidance system.

Bar tiles 60 are illustrated with parallel lines showing the direction of the elongated bump. A plurality of these tiles are attached in side-by-side, end-to-end relationship to a walkway area 61 which is adjacent to the lowered curbing 62. The lowered curbing 62 represents a curb cut area wherein curb section 63 is at standard curb elevation and curb section 62 is graded so that the level of the curb at **62*a* is substantially at street level 63. The bar tiles 60** are oriented in an elongated array such that all of the bars are longitudinally directed toward a central section of the lowered curbing.

The bar tiles 60 merge with an arrangement of dot tiles 64 which are attached to the walkway 61 intermediate the bar tiles 60 and lowered curb 62. The illustrated circle in each square representing a dot tile graphically identifies the tile as having non-elongated, raised dots of common configuration, such as illustrated in FIG. 1. This arrangement of dot tiles 64 form a dot tile barrier 65 along the length of lowered curb 62 to give tactile notice to a visually handicapped person of the hazardous curb area. A central part **64*a* of the dot tile barrier is positioned immediately approximate to one end 66** of the elongated array of bar tiles.

In this arrangement, it will be noted that the bar and dot tiles are configured in the shape of an arrow wherein the bar tiles correspond to a shaft portion of the arrow and the dot tiles correspond to a pointed segment at an end of the arrow nearest the street 63. By positioning this combination at a street corner, a visually handicapped person will encounter the bar tiles with a cane or by tactile detection under foot as their path intercepts the array of bar tiles. Upon encountering the elongated bars, the handicapped individual orients the preferred direction of passage along the direction of the elongated bumps of each bar tile. This path eventually merges into the dot tiles 64 which alert the handicapped pedestrian of the immediate presence of a curb and adjacent traffic flow. Accordingly, even though the street level and curb level **62*a*** are now the same, the pedestrian realizes that vehicle traffic will be a concern. In addition to the arrow configuration, a straight array of dot tiles may include an array of bar tiles intercepting from one side to provide a T-shape for giving direction of movement along the leg of the T. For example a bus stop along a straight section of curb may have an array of dot tiles with a perpendicular bar tile leg projecting into the adjacent walkway.

As will be noted from FIG. 6, two rows of bar tiles 60 form the side-by-side, parallel array and have the forward edge 66 butting against dot tiles **64*a* , which also are positioned in two rows along the curb area and which are fan-shaped to provide a continuous curve 79**. Based upon a 300 milimeter square tile, it will be noted that the length across the barrier of dot tiles or across the bar tiles is approximately 60 centimeters. This has been found to constitute an adequate span to ensure that all foot traffic will detect the bar and dot tiles as appropriate.

A further function of the bar tile 60 is to direct the pedestrian toward a guide strip 67. This guide strip is attached at the street surface 63 to define a proper course for crossing the street and to provide a track 70 which can be followed by the pedestrian. One end 68 of the guide strip is positioned near the curbing 62a along a common longitudinal direction 69 or axis with the array of bar tile 60. This track will ensure that the handicapped pedestrian will remain within the safety of the painted crosswalk markers 71.

Figure 7:
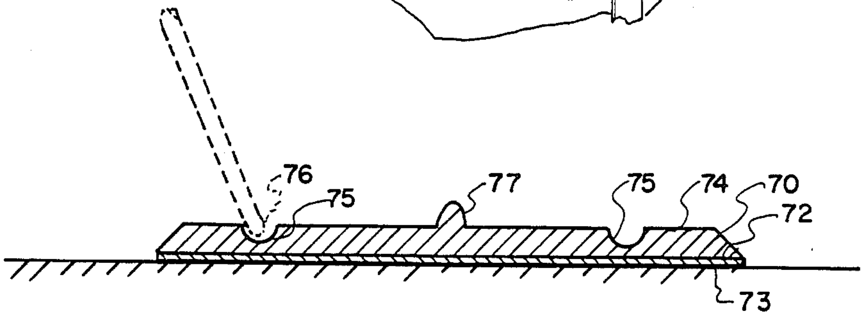
FIG. 7 shows a cross-section of a guidestrip illustrated in FIG. 6 and taken along the lines 7—7 thereof.

The guide strip 70 is shown in cross section in FIG. 7. As illustrated, the guide strip comprises a flat slat 70 having a flat bottom 72 which has an attached adhesive layer 73 for adhering the strip to the street surface. The top surface 74 includes a continuous track 75 which is adapted for contact with a distal end 76 of a cane or cue as typically used by the visually handicapped. Once the cane end 76 is properly located in the track channel 75, the handicapped person need merely move the cane along the channel or across the top of the strip and be certain of his proper direction of travel.

In addition to the channel or groove 75 configuration, the guide strip may include a ridge 77 which projects upward to form a track configured as a shoulder against which the end of the cane or cue may be slid to provdide desired tactile guidance. This may be useful where the handicapped person loses the groove due to sand fill, ice or the like and needs to retain his orientation.

The guide strip is of thin construction and may be fabricated of reinforced fiber composite material or ceramic to give strength and durability. The grooves 75 and ridge 77 are easily formed by the pultrusion process wherein the strip is pultruded through a die cavity having corresponding dimensions with the desired guide strip cross-section. Other materials will likewise be known to those skilled in the art and need not be enumerated herein. The guide strip 67 diverges to the left *67b* and to the right *67a* to guide the pedestrian across an intersection having two directions of pedestrian traffic. Typically, this guide strip will be 4½ inches wide and may include one channel or a plurality of channels or ridges as the need may be. The system of the bar tiles, dot tiles and guide strip provide complete orientation means for the handicapped pedestrian for navigating from one street corner to another street corner.

It will be apparent to those skilled in the art that the present system and component parts may be subject to variation. For example, FIG. 8 illustrates the use of a metal or other rigid substrate 80 to form the array of bumps 81 on a tile having a surface appearance such as shown in FIGS. 1 and 3. Instead of forming each bump individually as previously discussed, however, a plate is formed with the desired configuration of bumps impressed into the rigid plate structure. This forms cavities 82 which can only be seen from the bottom side. A layer of surface polymer is applied at the top surface of the plate to provide the desired textural properties, as well as a resilient cushion surface as previously described. A raised or projecting dimple 84 is formed at the top surface of the bump 81 to provide increased tactile sensitivity. As with the previous tile embodiments, this modified form is adhered to the pavement 85 with a uniform layer of contact adhesive 86 forming a retainer gasket 87 at the chambered edge. Accordingly, it is the inventor's intent that the disclosed embodiments not be construed as limiting, except as provided in the following claims.

I claim:

1. A tile for positioning on walkways, crosswalks and other areas of pedestrian traffic for providing direction and warning to visually handicapped persons, said tile comprising:

a flat plate comprised of a single layer of flexible, polymer composition with a top and bottom surface and including a chamfered edge around the periphery of the plate tapering to a lesser thickness at the extreme edge thereof;

raised bumps coupled and formed integrally with the top surface of the plate and of the same flexible, polymer composition, and projecting upward therefrom and being configured as truncated structure having a larger base attached at the top surface of the plate and tapering to a narrower top which includes a substantially flat, contacting surface adapted to withstand repeated contact with footware without significant wear;

said tile including a uniform adhesive layer applied at the bottom surface.

2. A tile as defined in claim 1, wherein the adhesive is free of fabric reinforcement or other filler that would inhibit flowability of the adhesive as the tile is compacted against pavement.

3. A tile as defined in claim 1, wherein the bump is approximately configured as a truncated hemisphere having a flat top surface substantially parallel with the flat plate.

4. A tile as defined in claim 1, wherein the bump is approximately configured as a truncated cone having a flat top surface substantially parallel with the flat plate.

5. A tile as defined in claim 1, wherein the flat surface of the bump includes a rough texture to provide traction against slipping.

6. A tile as defined in claim 1, wherein the bump is approximately configured as a half-section bar cut approximately along the longitudinal axis to form the larger base of the bump, the top of the bar being truncated to form the narrower top as a flat surface substantially parallel with the plate, each opposing end of the bar being rounded to resemble a quarter-sphere, the length of the bar extending nearly the full length of the plate.

7. A tile as defined in claim 6, wherein the flat surface of the bump includes a rough texture having roughening grooves and channels which are formed to a depth of approximately 0.25 milimeters.

8. A tile as defined in claim 6, wherein the flat surface of the bump includes means for developing frictional contact with footware contacting thereat.

9. A tile for positioning on walkways, crosswalks and other areas of pedestrain traffic for providing direction and warning to visually handicapped persons, said tile comprising:

a flat plate comprised of a flexible, polymer composition with a top and bottom surface;

raised bumps coupled integrally with the top surface of the plate and projecting upward therfrom and being configured as truncated structure which includes a substantially flat, contacting surface adapted to withstand repeated contact with footware without significant wear;

a rigid, noncompressible core having a diameter of less than one centimeter and being fully enclosed within at least one of the raised bumps near the bottom surface of the flat plate to increase the tactile sensitivity of the bump through the sole of the footware and to give the sensation of greater height than actually exists for the bump;

said tile including a uniform adhesive layer applied at the bottom surface.

10. A tile as defined in claim 9, wherein the core comprises an insert configured in the shape of a sphere.

11. A tile as defined in claim 9, wherein the core comprises an insert configured in a shape having at least one pointed end which is oriented toward the contacting surface of the bump.

12. A tile as defined in claim 9, wherein the core comprises a rigid rod totally embedded within an elongated bump.

13. A tile for positioning on walkways, crosswalks and other areas of pedestrian traffic for providing direction and warning to visually handicapped persons, said tile comprising:

a rigid plate having a top and bottom surface;

a plurality of raised bumps formed integrally with the top surface of the plate and projecting upward therefrom, said bumps being configured as truncated structure having a larger base attached at the top surface of the plate and tapering to a narrower top which includes a substantially flat surface adapted to withstand repeated contact with footware without significant wear;

said top surface further comprising an upward projecting dimple having sufficient height to enable its detection through the sole of a shoe;

a layer of resilient polymer material applied at the top surface and over the bumps to form a resilient top cover; said tile including a uniform adhesive layer applied at the bottom surface.

14. A tile adhered on a walkway, crosswalk or other area of pedestrain traffic for providing direction and warning to visually handicapped persons, said tile comprising:

a flatplate comprised of a flexible, polymer composition with a top and bottom surface and including a chamfered edge around the periphery of the plate tapered to a lesser thickness at the extreme edge thereof;

raised bumps coupled integrally with the top surface of the plate and projecting upward therefrom and being configured as truncated structure which includes a substantially flat, contacting surface adapted to withstand repeated contact with footware without significant wear;

a uniform adhesive layer compressed between the bottom surface and a surface of the walkway, crosswalk or other area of pedestrain traffic;

said compressed adhesive layer forming a continuous retainer gasket around the chamfered periphery of the tile wherein the retainer gasket forms an integral projection of the adhesive layer above the top peripheral edge of the plate and in contact with the chamfered edge thereof to retain the edge in an adhered condition to the adhesive layer.

15. A plurality of tiles as defined in claim 14, wherein the retainer gasket is formed above a space between two butting chamfered edges of adjacent tiles.

16. A system of tiles for guiding a visually handicapped person across an intersection or street bounded in part by lowered curbing, such as occurs at curb-cut or blended corners, which directs pedestrain traffic toward a crosswalk area, said system being comprised of:

a plurality of tiles having raised bumps projecting upward from a top surface of the tile wherein the bumps are configured as elongated bars to form a bar tile, said bar tiles being attached to a walkway area which is adjacent to the lowered curbing or other area requiring caution and having a tile orientation in an elongated array such that all of the bars are longitudinally oriented toward a central section of the lowered curbing or caution area; and a plurality of tiles having raised bumps projecting upward from a top surface of the tile wherein the bumps are configured as non-elongated raised dots of common cinfiguration to form a dot tile, said dot tiles being attached in side-by-side array to the walkway near one end of the bar tiles and along the lowered curb or caution area to form a dot tile barrier to give tactile notice of the curb or caution area to a visually handicapped person, a central part of the dot tile barrier being immediately proximate to one end of the elongated array of bar tiles;

the bar and dot tiles being configured in the general shape of a "T" wherein the bar tiles correspond to a leg portion of the T and the dot tiles correspond to a top cross segment at an end of the leg nearest the street, the combination being positioned where the visually handicapped person will encounter the bar tiles with a cane or by tactile detection under foot, whereupon the bar tiles provide an indication of direction, based upon the direction of the elongated bumps, to the top of the T which is detected by sensing the dots of the dot tiles, the dot tiles further providing an indication of location of hazardous curbing and adjacent traffic flow.

17. A system of tiles as defined in claim 16, wherein the bar tiles are positioned on the walkway as two rows of tiles in side-by-side, parallel array, a most forward edge of the bar tile array toward the street being abutted against dot tiles forming part of the dot tile barrier which includes two rows of dot tiles in side-by-side array.

18. A system for guiding visually handicapped persons as defined in claim 16, further comprising a guide strip for attachment at a street surface to define a proper course for a visually handicapped person to utilize in crossing a street, one end of the guide strip being positioned near a curb bounding the street, said guide strip comprising an elongated body having (i) a flat bottom surface including means for adhering the strip to the street surface, and (ii) a top surface including a continuous and uninterrupted track adapted for contact with a distal end of a cane or cue to provide continuous tactile guidance to the handicapped person controlling the cane or cur for crossing the street.

19. A system of tiles as defined in claim 16, further comprising a guide strip attached at a street surface to define a proper course for crossing the street, one end of the guide strip being positioned near the curbing along a common longitudinal axis of the array of bar tiles, said guide strip comprising an elongated body having (i) a flat bottom surface including means for adhering the strip to the street surface; and (ii) a top surface including a continuous track adapted for contact with a distal end of a cane or cue to provide continuous tactile guidance to the handicapped person controlling the cane or cue for crossing the street.

20. A system of tiles as defined in claim 19, wherein the guide strip comprises an elongated, flat slat having a flat bottom including a layer of adhesive applied thereto; the top of the slat having an indented track or groove configured in size to receive the end of the cane or cue.

21. A system of tiles as defined in claim 19, wherein the guide strip comprises an elongated, flat slat having a flat bottom including a layer of adhesive applied thereto; the top of the slat having a projecting ridge as a track configured in size to provide a shoulder against which the end of the cane or cue may be slid to provide the desired tactile guidance.

* * * * *